Feb. 9, 1937. B. C. EBERHARD 2,070,525
METHOD AND APPARATUS FOR MAKING INNER TUBES
Filed Oct. 26, 1934 2 Sheets-Sheet 1
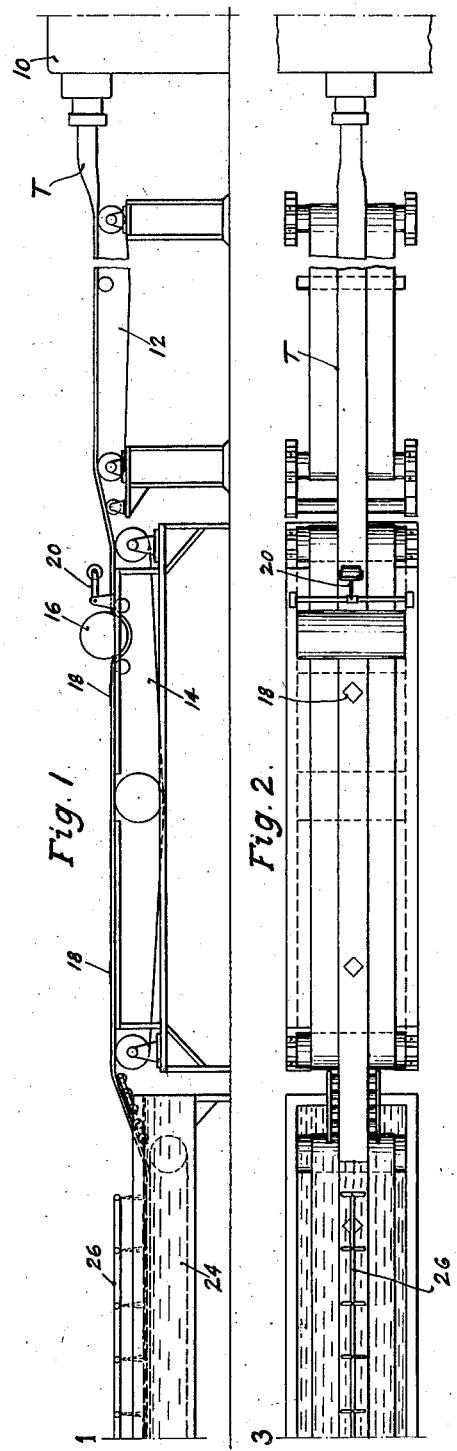
Inventor
BOYD C. EBERHARD.
Attorney

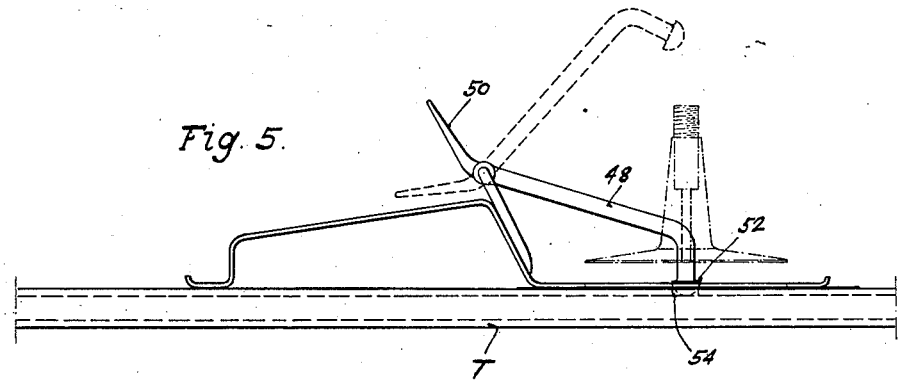
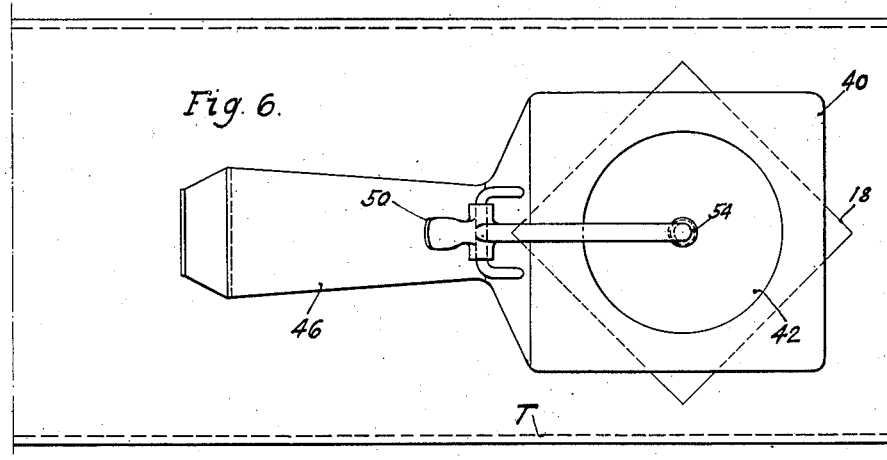
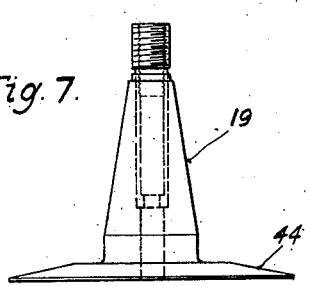
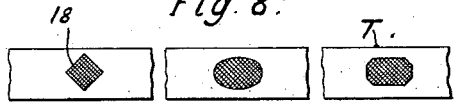

Patented Feb. 9, 1937

2,070,525

UNITED STATES PATENT OFFICE 2,070,525

METHOD AND APPARATUS FOR MAKING INNER TUBES

Boyd C. Eberhard, Akron, Ohio, assignor to Wingfoot Corporation, Wilmington, Del., a corporation of Delaware Application October 26, 1934, Serial No. 750,153

19 Claims. (Cl. 154—14)

This invention relates to means and methods for making inner tubes and has particular reference to the manufacture of inner tubes having rubber valve stems for inflation purposes as disclosed in my co-pending application Serial No. 610,000, filed May 9, 1932.

For many years inner tubes employed with pneumatic tires have been made with metal valve or inflation stems which are secured to the rubber inner tube by metal flanges and sealing washers with rubber and metal valve insides or parts being employed in the metal stem to control the passage of air. As completely discussed in my co-pending application referred to above, metal stems have proved undesirable in certain instances as, for example, where the tire and tube are run after blowout or puncture for even short distances inasmuch as the metal valve stem tends to cut through the inner tube and even injure the tire casing. The rubber valve stem having a rubber base or securing flange and a short metal part vulcanized in the end of the rubber stem for receiving the rubber and metal valve insides was accordingly devised to avoid and overcome the difficulties of the referred to metal stem.

It has been found, however, by experience that the same methods and apparatus for manufacture and assembly of metal valve stems cannot be employed in the making of rubber stems on inner tubes. It has further been found that there are numerous problems and difficulties standing in the way of a continuous manufacture of rubber valve stem inner tubes. For example, trouble has been experienced in properly centering the rubber stems and their integral attaching base flanges of rubber over the air valve hole through the inner tube. Again in handling the tubes after their initial formation from the raw rubber gum or stock, it was very troublesome to control the rubber goods so that a satisfactory bond between the valve stem and tube could be obtained upon vulcanization.

It is an object of the present invention to avoid and overcome the above enumerated difficulties of prior apparatus and methods by the provision of a new, novel and improved apparatus and method for continuously producing inner tubes having rubber valve stems.

Another object of the invention is to provide improved means and methods for accurately centering rubber valve stems over the air valve hole cut in the inner tube proper.

Another object of the invention is the provision of means and process whereby the inner tube stock can be continuously produced on an extruding machine and passed through the usual cooling and soapstoning operations and yet be so handled that the rubber valve stems can be positively and accurately applied upon the individual inner tubes.

The foregoing and other objects of the invention are achieved by the method hereinafter disclosed and by the apparatus illustrated in the accompanying drawings wherein Fig. 1 is a partial side elevation of one form of apparatus embodying the present invention.

Fig. 2 is a plan view of the mechanism illustrated in Fig. 1.

Fig. 3 is a side elevation of the other end of the apparatus seen in Fig. 1 with the apparatus being joined on the line 1—3, as will be evident.

Fig. 4 is a plan view of the mechanism seen in Fig. 3.

Fig. 5 is a side elevation of a template for centering the rubber valve stem properly over the air valve hole in an inner tube.

Fig. 6 is a plan view of the means seen in Fig. 5.

Fig. 7 is a side elevation of the rubber valve stem.

Fig. 8 is a plan view of an inner tube provided with several different forms of protective means applied over the valve patch area.

In certain fundamental aspects the apparatus and method of manufacturing the rubber valve stem inner tube are quite similar to those employed in making the old metal-stem-type of tube. Thus, the present invention contemplates means for extruding a rubber tube, means for cooling and soap-stoning the same with the usual cutting of the tube into lengths and the finishing operations. There are a number of new and novel features of method and apparatus which are supplied by the present invention to work with the old continuous production methods and apparatus which adapt the same to the continuous manufacture of rubber valve stem tubes. These new features will become evident and be explained as the description proceeds. Thus, referring to Figs. 1 to 4 of the drawings, the numeral 10 indicates an extruding machine which is adapted to continuously expel a tube T of unvulcanized rubber stock with the interior of the tube being provided with a soapstone or other similar treatment for preventing the inner walls of the tube from sticking together. The tube T is picked up on a conveyor 12 which may have associated therewith weighing apparatus or the like (not shown) whereby the weight or thickness of the inner tube can be measured and controlled accordingly.

From the conveyor 12 the tube T passes to another conveyor 14, which has associated therewith means for applying a piece of protective material 18 over the portion of the inner tube to which the rubber valve stem 19 will be secured. These applying means have been indicated generally by the numeral 16 and will not be described in detail inasmuch as apparatus of the character disclosed in Snyder Patent No. 1,956,050 may be employed. It will be understood, of course, that instead of applying the rubber and rubberized fabric patch shown in the Snyder patent that the present invention contemplates applying a patch of protective material which can be removed after the tube-cooling and soapstoning operations to permit the application of the rubber valve stem 19 to a clean and protected area of the tube. The invention particularly has in mind the application of patches of holland cloth, cellophane, Pliofilm or other thin, flexible air-tight and water-proof films or sheets which are relatively inexpensive and satisfactory.

The invention likewise contemplates a hand method of applying the protective sheets to the inner tubes and when this procedure is followed it may be found necessary to center and space the protective sheets by a suitable spacing wheel positioned above the conveyor in accordance with known practice or a mark may be made on the conveyor belt carrying the inner tube or on an auxiliary indicating belt to indicate the place for applying the protective patch. When the protective patches 18 are applied by hand it may be found desirable to employ a pressure roller 20 which is periodically actuated by pneumatic or other means as controlled by a suitable timing or trip mechanism, which roller 20 will function to very positively and tightly roll down the protective patch 18 upon the inner tube.

It may be found desirable both in conjunction with the automatic applying means 16 and the roller means 20 to so design the same that one corner or edge of the protective patch 18 will be left free whereby removal of the patch will be facilitated at a later point in the tube making operation. If it is found that the applying means 16 can serve to roll down the protective patches 18 on the inner tube even when they are applied by hand, then the use or necessity of pressure roller 20 can be eliminated.

From the conveyor 14, the inner tube T with the patches 18 spaced at uniform intervals thereon is carried to the cooling tank 24 where the water spray 26 functions to reduce the temperature and tackiness of the rubber tube.

After leaving the cooling tank 24 the inner tube is passed through a water and soapstone bath 28 or other suitable treating means for reducing the tackiness of the rubber and for thereby preparing the same for handling. The inner tube T is now preferably passed through a drying chamber 32 where the soapstone solution is completely dried by compressed air or like means. From the drying chamber 32 the inner tube T passes on to a cutting table 34 where the inner tube is cut into the proper lengths which have been marked thereon either by a length-indicating wheel or by an operator in accordance with marks on the conveyor or auxiliary indicating belt.

Once the continuous length of tube is cut into the individual tubes, each with a protective patch 18 thereon, the valve or air hole is cut in the inner tube through the protective patch 18 and this operation is ordinarily performed by an independent machine positioned adjacent the cutting table 34 and having a rotary hollow die. The tubes are now next circled and joined together at their ends and are ready for applying the rubber valve stem 19 thereto. It is possible also to apply the stems before circling although this is not preferred.

Once the hole has been cut through the inner tube in the area of the protective patch 18, and the tube ends circled and joined, the patch 18 is grasped by the free corner or side and pulled off of the inner tube. The individual length of inner tube is now ready to have the rubber valve stem 19 seen in Fig. 7 applied thereto and to facilitate this operation means such as jig or template shown in Figs. 5 and 6 are employed. The means illustrated comprises a plate 40 formed with an aperture 42 therethrough of a size to snugly receive the flange or base 44 of the rubber valve stem 19. Formed integral with the plate 40 is a handle 46 which may be bent upwardly at its middle to facilitate holding the plate on the inner tube T. A centering member in the form of a rod 48 is pivotally secured to the handle 46 and the rod 48 is provided with a thumb pedal 50 to permit it to readily be raised or lowered by the same hand that is grasping the handle 46. The rod 48 is likewise formed with a round button end 52 which is adapted to be received in the opening 54 forming the air passageway into the inner tube T.

Thus in the operation of the jig the inner tube T rests flat on the operating table and the jig is placed over the tube so that the round button 52 on the rod 48 will be received in the air passage 54 of the inner tube when the centering rod 48 is in the full-line position seen in Fig. 5. The thumb pedal 50 is then depressed to move the centering rod 48 up to the dotted position shown in Fig. 5 and the rubber valve stem 19 is then applied in the aperture 42 formed in the plate 40 and is pushed tightly into engagement with the inner tube. It will thus be evident that the hole through the valve stem is in exact alignment with the opening 54 in the inner tube T. Ordinarily no cement is needed to secure the valve stem in place because of the very clean and tacky surface offered by the inner tube area around the air passage 54 in that the protective patch 18 has just been removed. The invention particularly contemplates, however, employing a pressing device such as a form fitting jig operated by a compressed air motor to tightly press the positioned valve stem down against the tube.

The inner tube lengths with the valve stem attached are then vulcanized in the same manner as is well known in the handling of inner tubes equipped with metal stems.

In certain instances air under pressure can be put in the tube to prevent piercing of more than the one side of the tube when the hole for the valve is being formed.

When air holes are punched in the tube prior to cooling and soap-stoning care must be exercised to prevent the entrance of liquid inside the tube. This may be accomplished by blowing air out through the holes in the tube continuously or by inverting the tube during its passage through the liquids. Again the holes may be punched in a similar manner after the liquid treating steps. However, the best manner of achieving the desired end is to punch the air hole 54 in the tube and immediately thereafter apply a protective patch 18 over the hole which is not removed until the valve stem 19 is to be applied as heretofore described.

Thus the invention teaches in addition to the much more complete disclosure above that a marking and punching operation can be incorporated at or after the station where the protective patch 18 is applied.

It is also within the scope of the invention to incorporate in the now standard auxiliary rotatable punching die such as ordinarily employed to punch the air passage 54 through the inner tube, a marking or printing means which will contact with the surface of the tube to define a circle or marks which will readily permit the operator to center the flange 44 of the rubber valve stem on the inner tube without the use of a template.

From the foregoing description it will be evident that improved methods and apparatus have been disclosed for manufacturing in continuous production, inner tubes having rubber valve stems. The difficulty of properly centering the rubber valve stems over the air-passage holes in the inner tube has been overcome. Likewise a novel process and mechanism for insuring a firm bond between the rubber valve stem and the inner tube has been taught.

It will be appreciated that in accordance with the patent statutes several forms of the invention have been illustrated and described in detail, however the invention is not limited thereto or thereby but is defined in the appended claims.

I claim:

1. That process of making inner tubes having valve stems with rubber base flanges which includes the steps of extruding a tube of rubber stock, applying a patch of protective material to the valve stem area, cooling the tube with tube contacting water, coating the tube with a material to remove the tackiness, cutting the tube in lengths, punching an air passage through each protective patch and the tube beneath, circling the tube length, removing the patch, centering a valve stem having an integral rubber attaching flange over the air passage, applying the stem to the tube, and vulcanizing the tubes.

2. That process of making inner tubes having valve stems with rubber base flanges which includes the steps of forming a tube of rubber stock, applying a patch of protective material to the valve stem area, cooling the tube, coating the tube with a material to remove the tackiness, cutting the tube in lengths, punching an air passage through each protective patch and the tube beneath, circling the tube lengths, removing the patch, centering a valve stem having an integral rubber attaching flange over the air passage, applying the stem to the tube, and vulcanizing the tubes.

3. That process of making inner tubes having valve stems with rubber base flanges which includes the steps of extruding a tube of rubber stock, applying a patch of protective material to the valve stem area, cooling the tube with tube contacting water, cutting the tube in lengths, punching an air passage through each protective patch and the tube beneath, circling the tube lengths, removing the patch, centering a valve stem having an integral rubber attaching flange over the air passage, applying the stem to the tube, and vulcanizing the tubes.

4. That process of making inner tubes having valve stems with rubber base flanges which includes the steps of extruding a tube of rubber stock, applying a patch of protective material to the valve stem area, cutting the tube in lengths, punching an air passage through each protective patch and the tube beneath, circling the tube lengths, removing the patch, centering a valve stem having an integral rubber attaching flange over the air passage, applying the stem to the tube and vulcanizing the tubes.

5. In the manufacture of inner tubes having valve stems with rubber base flanges that method which includes applying a removable protective layer on the inner tube length in the valve patch area substantially immediately after it is extruded, cooling and soapstoning the tube, removing the layer, cutting a valve hole in the tube, and centering and pressure applying the rubber base flange to the tube without cleaning or cement.

6. In the manufacture of inner tubes having valve stems with rubber base flanges that method which includes applying a removable protective layer on the inner tube length in the valve patch area substantially immediately after it is extruded and thereafter removing the layer, cutting a valve hole in the tube, and centering and pressure applying the rubber base flange to the tube without cleaning or cement.

7. In the manufacture of inner tubes having valve stems with rubber base flanges that method which includes applying a removable protective layer on the inner tube length in the valve patch area substantially immediately after it is extruded.

8. In the manufacture of inner tubes having valve stems with rubber base flanges that method which includes applying a removable protective layer on the inner tube length in the valve patch area substantially immediately after it is extruded, cooling and soapstoning the tube, removing the layer, cutting a valve hole in the tube, centering and pressure applying the stem without cleaning or cement, and positively guiding the stem to insure substantially the exact alignment of the stem and air passage.

9. That method of producing inner tubes which comprises protecting the valve stem area of the tube until ready for application of a stem having a rubber base flange and then applying the stem in a manner to positively center the stem over the air hole in the tube.

10. Mechanism to be used in applying valve stems to inner tubes which mechanism includes a template, means on the template for receiving a stem, and means for centering the template and the stem receiving means over the air hole in the tube so that the stem will be on the tube in alignment with the air hole.

11. Mechanism to be used in applying valve stems to inner tubes comprising in combination a plate having an aperture therethrough, a rod pivotally mounted on the plate and adapted to removably extend into the center of the aperture, a handle on the plate for holding the same and a thumb treadle on the rod adjacent the handle for controlling the position of the rod.

12. Mechanism to be used in applying valve stems to inner tubes comprising in combination a plate having an aperture therethrough, and a rod pivotally mounted on the plate and adapted to removably extend into the center of the aperture.

13. Aligning means including a plate having an aperture therethrough for receiving and passing a flanged object and removable means extending through the substantial center of the aperture for centering the plate and its aperture relative to other bodies.

14. In the manufacture of inner tubes having valve stems with rubber base flanges, that method which includes applying a removable protective layer on the inner tube length in the valve patch area substantially immediately after it is made and thereafter removing the layer, cutting a valve hole in the tube, and centering and pressure applying the stem.

15. Aligning means for manufacturing inner tubes which comprises a plate having an aperture therethrough for receiving a valve stem base, and removable means on said plate extending through the substantial center of the aperture for centering the plate and its aperture relative to the tube, said removable means having a portion thereof adapted to be aligned with the hole in the inner tube which is to communicate with the opening through said stem.

16. In the manufacture of inner tubes having valve stems with rubber base flanges, that method which includes applying a removable protective layer on the inner tube length in the valve patch area substantially immediately after it is made, cutting a valve hole simultaneously through said patch and tube, removing said patch and centering and pressure applying the rubber base on said stem to said tube with the opening therein in communication with the hole in said tube.

17. In the manufacture of inner tubes having valve stems with rubber base flanges, that method which includes applying a removable protective layer to the inner tube length in the valve patch area substantially immediately after it is made and before any treatment thereof which might impair the natural tacky condition of the extruded tube.

18. Aligning means including a plate having a valve stem centering portion thereon and a member movably mounted on said plate for locating the valve stem centering means in proper relation to the hole in an inner tube to which the stem is to be applied.

19. In the manufacture of inner tubes having valve stems with a rubber flange, that method which includes applying a removable protective layer on the inner tube in the valve patch area substantially immediately after the tube is made and before any treatment thereof which might impair the natural tacky condition of the newly made tube.

BOYD C. EBERHARD.